United States Patent
Ou-Yang et al.

(10) Patent No.: US 8,811,716 B2
(45) Date of Patent: Aug. 19, 2014

(54) METHOD TO DETERMINE FIDUCIAL POINT FOR HOLOGRAPHIC DATA STORAGE

(75) Inventors: Mang Ou-Yang, Hsinchu (TW); Yu-Ta Chen, Taipei (TW)

(73) Assignee: National Chiao Tung University, Hsinchu (TW)

( * ) Notice: Subject to any disclaimer, the term of this patent is extended or adjusted under 35 U.S.C. 154(b) by 251 days.

(21) Appl. No.: 13/336,493

(22) Filed: Dec. 23, 2011

(65) Prior Publication Data

US 2013/0084016 A1 Apr. 4, 2013

(30) Foreign Application Priority Data

Sep. 30, 2011 (TW) .............................. 100135557 A (51) Int. Cl.
G06K 9/00 (2006.01)
G06K 9/46 (2006.01)
G06K 9/36 (2006.01)
G11B 7/0065 (2006.01)

(52) U.S. Cl.
CPC .................................. G11B 7/0065 (2013.01)
USPC ........................... 382/151; 382/190; 382/287

(58) Field of Classification Search
None
See application file for complete search history.

(56) References Cited

U.S. PATENT DOCUMENTS

| 5,920,536 | A * | 7/1999 | Campbell et al. ............. 369/103 |
| 5,982,513 | A | 11/1999 | Zhou et al. |
| 8,194,095 | B2 * | 6/2012 | Imai et al. ..................... 345/590 |
| 2003/0086018 | A1 * | 5/2003 | Berman et al. ................ 348/584 |
| 2005/0197568 | A1 * | 9/2005 | Vass et al. ..................... 600/426 |
| 2008/0030821 | A1 * | 2/2008 | Minabe et al. ................. 359/29 |
| 2010/0097675 | A1 * | 4/2010 | Waldman et al. .............. 359/24 |
| 2010/0103491 | A1 | 4/2010 | Hashimoto et al. |

FOREIGN PATENT DOCUMENTS

| JP | 2010-231850 A | 10/2010 |
| WO | WO 2008/114447 A1 | 9/2008 |

OTHER PUBLICATIONS

Liu et al, "Registration of IR and EO Video Sequences based on Frame Difference," 2007, Fourth Canadian Conference on Computer and Robot Vision(CRV'07), pp. 1-6.*
Wang et al, "Image Quality Assessment: From Error Visibility to Structural Similarity," 2004, IEEE Transactions on Image Processing, vol. 13, No. 4, pp. 1-14.*
Ayres et al., "Image Oversampling for Page-Oriented Optical Data Storage", Applied Optics, (Apr. 10, 2006), pp. 2459-2464, vol. 45, No. 11.

(Continued)

*Primary Examiner* — Bhavesh Mehta
*Assistant Examiner* — David F Dunphy
(74) *Attorney, Agent, or Firm* — Muncy, Geissler, Olds & Lowe, P.C.

(57) ABSTRACT

A method to determine a fiducial point for holographic data storage is disclosed, which utilizes a gray-level frame to sequentially retrieve a regional image used as a retrieved image with the size equal to that of the frame from a received gray-level image. The gray-level frame is compared with each retrieved image to obtain a plurality of values and construct a 2D proto-matrix. The 2D proto-matrix is transformed into a 2D matrix via letting the values smaller than 0 be 0. The 2D matrix and a retrieving matrix, which has a dimensionality equal to or smaller than that of the frame, are used to obtain an anchor matrix. A greatest value in the central region of the 2D matrix is found to function as an anchor value according to the anchor matrix, thereby find a fiducial point in the gray-level image.

12 Claims, 5 Drawing Sheets

(56) References Cited

OTHER PUBLICATIONS

Shelby et al., "Pixel-Matched Holographic Data Storage with Megabit Pages", Optics Letters, (Oct. 1, 1997), pp. 1509-1511, vol. 22, No. 19.

Yang et al., "A Gray Level Weighting Method to Reduce Optical Aberration Effect in Holographic Data Storage System," IEEE Trans. Magn. (Mar. 2011), pp. 546-550, vol. 47, No. 3.

Daiki Azuma, et al., "Image Quality Asswessment Method for Various-Sized Images Based on SSIM", The Institute of Electronics, Information and Communication Engineers, May, 2011, 8 pages.

Master's Thesis of Department of Electrical Engineering of Waseda University, Japan, Feb. 4, 2011, Keigo Muto, PSNR/SSIM Estimation for JPECT Image, using DCGT Coefficient.

Published document, The Institute of Electronic, Information and Communication Engineers, Japan, 2010, Shinichi Minato, 1-3 Several Characteristics of Logic Function.

Master's Thesis of Department of Electrical Engineering of Waseda University, Japan, Feb. 4, 2011, Keigo Muto, PSNR/SSIM Estimation of JPECT Image, using DCGT Coefficient.

Published document, The Institute of Electronic, Information and Communication Engineers, Japan, 2010, Shinichi Minato, 1-3 Several Characters of Logic Function.

* cited by examiner

Fig. 1

PRIOR ART

METHOD TO DETERMINE FIDUCIAL POINT FOR HOLOGRAPHIC DATA STORAGE

BACKGROUND OF THE INVENTION

1. Field of the Invention

The present invention relates to a method to determine a fiducial point, particularly to a method to determine a fiducial point for holographic data storage.

2. Description of the Related Art

The Holographic data storage device features both high speed and high capacity and thus has very high potential among next-generation data storage devices. However, the holographic data storage device demands very high quality in optical systems and system calibration because it is likely to be affected by noise (such as aberration) under the high transfer speed thereof. The abovementioned factors make the holographic data storage device hard to commercialize.

Figure 1:
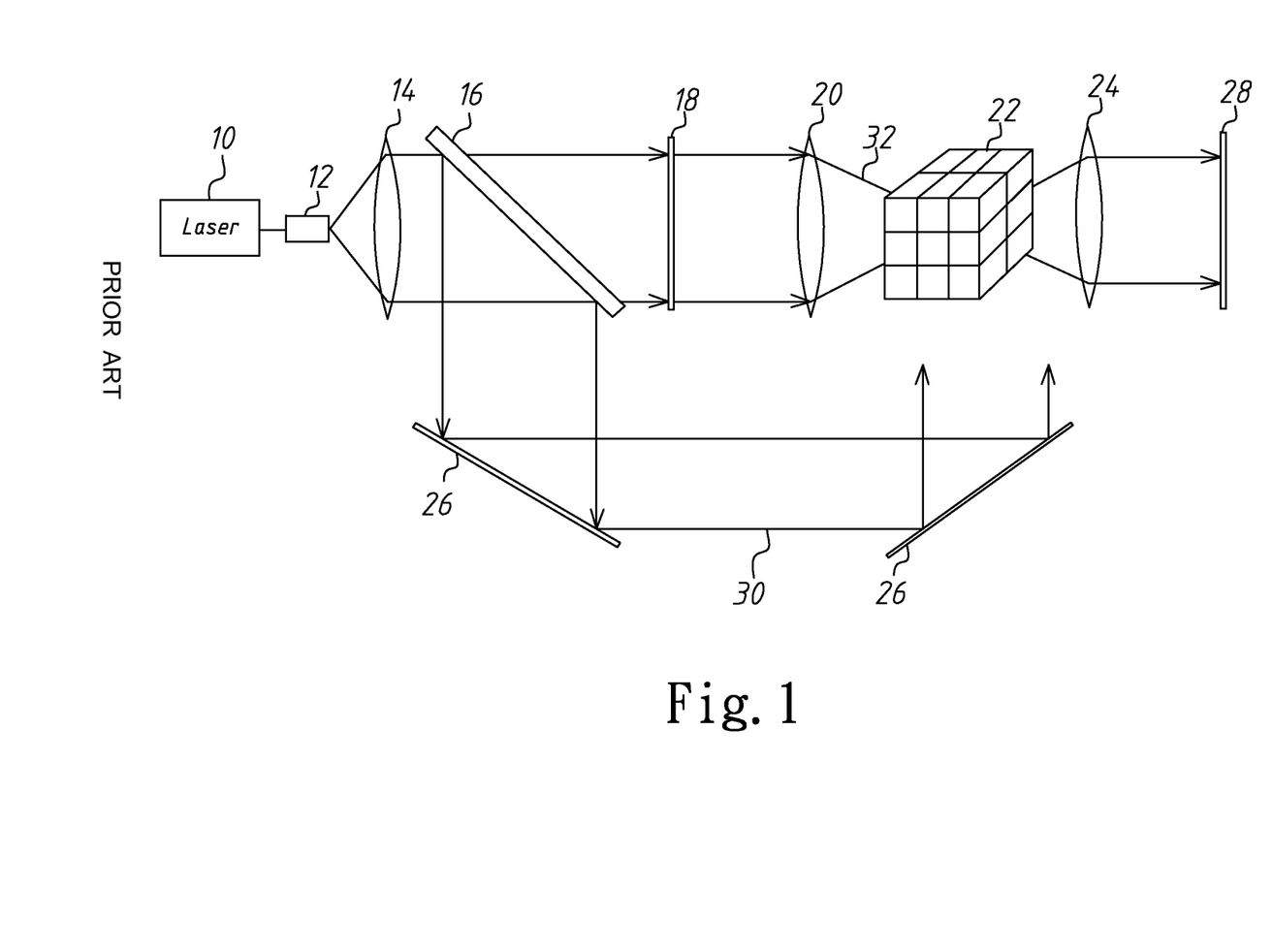
FIG. 1 schematically shows a conventional holographic data storage device.

Refer to FIG. 1. A conventional holographic data storage device comprises a laser source 10, a spatial filter 12, a first lens 14, a beam splitter 16, a spatial modulator 18, a second lens 20, a recording medium 22, a third lens 24, a reflector 26, and a 2D detector 28. The beam emitted by the laser source 10 passes through the spatial filter 12, the first lens 14 and the beam splitter 16 and then is split into a reference beam 30 and a signal beam 32. The reference beam 30 proceeds toward the reflector 26. The signal beam 32 proceeds toward the spatial modulator 18. The reflector 26 reflects the reference beam 30 to the recording medium 22. The spatial modulator 18 encodes the signal beam 32. The encoded signal beam 32 also proceeds to the recording medium 22. The reference beam 30 interferes with the encoded signal beam 32 to form an interference pattern stored in the recording medium 22. In reading the data stored in the recording medium 22, the signal beam 32 is shielded, and the reference beam 30 is incident on the recording medium 22 to generate an interference pattern on the 2D detector 28. However, the image of the interference pattern may be distorted because of aberration, etc.

In order to recover the image received by the 2D detector, several image recovery technologies had been developed. For an example, a U.S. Pat. No. 5,982,513 uses the angle between the reference beam and the incident beam to calculate the location of the image. However, the prior art is unlikely to align the images that are out of focus. For another example, M. Ayres, et al. proposed a paper in 2006 "Image Oversampling for Page-Oriented Optical Data Storage", wherein an appropriate proportion should be maintained between the 2D detector and the spatial modulator. Thus, the prior art cannot perform image processing for any system. For yet another example, R. M. Shelby, et al. proposed a paper in 1997 "Pixel-matched holographic data storage with megabit pages", which involves a pixel-matched system demanding precise alignment, high quality optical systems and smaller aberration. Therefore, the prior art is too expensive to popularize. For a further example, M. Ou-Yang et al. proposed a paper in 2011 "A Gray Level Weighting Method to Reduce Optical Aberration Effect in Holographic Data Storage System". In the prior art, a single threshold is corresponding to multiple regions in a block during binary conversion because of noise. Thus, the fiducial point is hard to determine in the prior art.

Accordingly, the present invention proposes a method to determine a fiducial point for holographic data storage to overcome the abovementioned problems.

SUMMARY OF THE INVENTION

The primary objective of the present invention is to provide a method to determine a fiducial point for holographic data storage, which performs regional comparison on retrieved images via comparing each retrieved image with a built-in reference gray-level frame, and which uses a 2D approach to fast and precisely find a fiducial point, whereby it is unnecessary for the blocks of the gray-level image to form closed areas, and whereby is reduced BER (Bit Error Rate) of the system, wherefore is achieved high-quality holographic data storage with a low-cost optical system.

To achieve the abovementioned objective, the present invention proposes a method to determine a fiducial point for holographic data storage, which comprises steps: receiving a gray-level image; using a gray-level frame to sequentially retrieve from the gray-level image regional images having the same size as the gray-level frame to function as retrieved images, comparing the gray-level frame with each retrieved image to obtain a plurality of values, and using the values to construct a 2D proto-matrix; transforming the 2D proto-matrix into a 2D matrix via letting the values which are smaller than 0 be 0 and keeping the rest of the values unchanged; using the 2D matrix and a retrieving matrix, which has a dimensionality equal to or smaller than that of the reference gray-level frame, to obtain an anchor matrix, and finding a greatest value in the central region of the 2D matrix to function as an anchor value according to the anchor matrix; and using the anchor value to find a corresponding position in the gray-level image, and using the position as a fiducial point.

Below, the embodiments are described in detail in cooperation with the attached drawings to make easily understood the characteristics and efficacies of the present invention.

DETAILED DESCRIPTION OF THE INVENTION

In a holographic data storage device, the 2D detector receives the magnified gray-level pattern, however, which is likely to be affected by the magnifying power, noise, and random errors of the system. Therefore, how to recover the gray-level pattern is a critical problem for holographic data storage. One of the steps to recover the gray-level pattern is to determine the coordinates of the fiducial point so as to recover the pixel size of each signal. Below is introduced the method to determine a fiducial point for holographic data storage of the present invention, which applies to a coaxial or off-axis holographic data storage device, and which is used to obtain the fiducial point and correctly recover the gray-level pattern.

Figure 2:
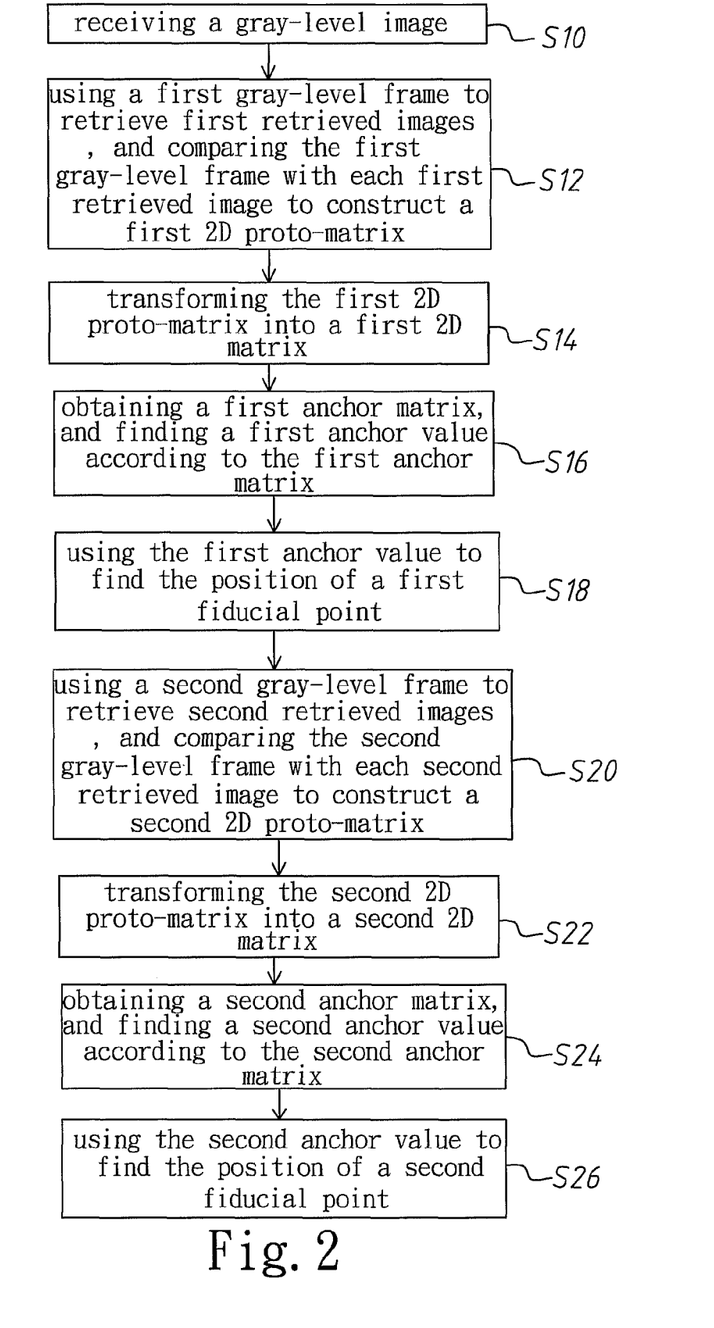
FIG. 2 shows a flowchart of a method to determine a fiducial point for holographic data storage according to one embodiment of the present invention.
Figure 3A:
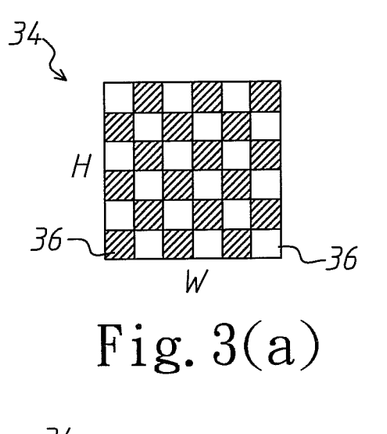
FIGS. 3(a)-3(e) schematically show steps of f a method to determine a fiducial point for holographic data storage according to one embodiment of the present invention.

Refer to FIG. 2 and FIGS. 3(a)-3(e). In Step S10, the 2D detector receives a gray-level image having a plurality of blocks. The gray-level image has an N-bit grayscale depth and a maximum gray-level value of ($2^N-1$). Each block contains n×n pieces of pixels, wherein n is a natural number. The block may be a black or white block. Thus, the gray-level image contains a plurality of white blocks and black blocks, whose numbers are identical, and whose arrangement is exemplified by a checkerboard, as shown in the drawings. The gray-level image is in form of an H×W array, wherein H and W are natural numbers. In FIG. 3(a), the gray-level image 34 is a 6×6 array containing 36 pieces of blocks 36. The block 36 may be a black block designated by hatchings or a blank white block. In FIG. 3(a), the black and white blocks are arranged similarly to a checkerboard.

In Step S12, use a built-in first reference gray-level frame to sequentially retrieve regional images each having the same size as the first reference gray-level frame to function as first retrieved images. In other words, the retrieving activity starts from the first row and the first column of the blocks and advances toward the last row and the last column sequentially pixel by pixel. At the same time, compare the first reference gray-level frame with each first retrieved image to obtain a plurality of first values, which are used to construct a first 2D proto-matrix. The first reference gray-level frame may be in form of a square, a strip, a cross, intersecting lines, a circle, a triangle, a rhombus, or a polygon. In the drawings, a square is used to exemplify the first reference gray-level frame. The first reference gray-level frame has a dimensionality of m×m, wherein m≥2 and m is a natural number. The value of m correlates with the magnifying power of the received image. The first reference gray-level frame includes a plurality of first black blocks and first white blocks. The gray-level values of the first black blocks and the first white blocks may be either assigned according to requirement of the system or respectively preset to be 0 and 225. Besides, the first black blocks and the first white blocks are also arranged similarly to a checkerboard. Further, an SSIM (Structure Similarity) algorithm is used to perform regional comparison for the first reference gray-level frame and each first retrieved image. Thereby, it is unnecessary for the blocks of the gray-level image to form closed areas. The first value V1 is obtained according to Equation (1):

$$V1 = \frac{(2\mu_x \mu_{yI} + C_{1I})(2\sigma_{xyI} + C_{2I})}{(\mu_x^2 + \mu_{yI}^2 + C_{1I})(\sigma_x^2 + \sigma_{yI}^2 + C_{2I})} \quad (1)$$

wherein x is the reference gray-level image and yI is the first retrieved image, and wherein $C_{1I}$ and $C_{2I}$ correlate the brightnesses, contrast ratios and constitutive properties of the gray-level image and the first retrieved image, and wherein $0<C_{1I}<0.1$ and $0<C_{2I}<0.1$, and wherein and $\mu_x$ and $\mu_{yI}$ are respectively the image strengths of the gray-level image and the first retrieved image and respectively expressed by Equation (2) and Equation (3), and wherein $\sigma_x$ and $\sigma_{yI}$ are respectively the image standard deviations of the gray-level image and the first retrieved image and respectively expressed by Equation (4) and Equation (5), and wherein $\sigma_{xyI}$ is the covariable of the gray-level image and the first retrieved image and expressed by Equation (6).

$$\mu_x = \frac{1}{N} \sum_{i=1}^{N} x_i \quad (2)$$

$$\mu_{yI} = \frac{1}{N} \sum_{i=1}^{N} yI_i \quad (3)$$

$$\sigma_x = \left[ \frac{1}{N-1} \sum_{i=1}^{N} (x_i - \mu_x)^2 \right]^{1/2} \quad (4)$$

-continued $$\sigma_{yI} = \left[ \frac{1}{N-1} \sum_{i=1}^{N} (yI_i - \mu_{yI})^2 \right]^{1/2} \quad (5)$$

$$\sigma_{xyI} = \frac{1}{N-1} \sum_{i=1}^{N} (x_i - \mu_x)(yI_i - \mu_{yI}) \quad (6)$$

Figure 3B:
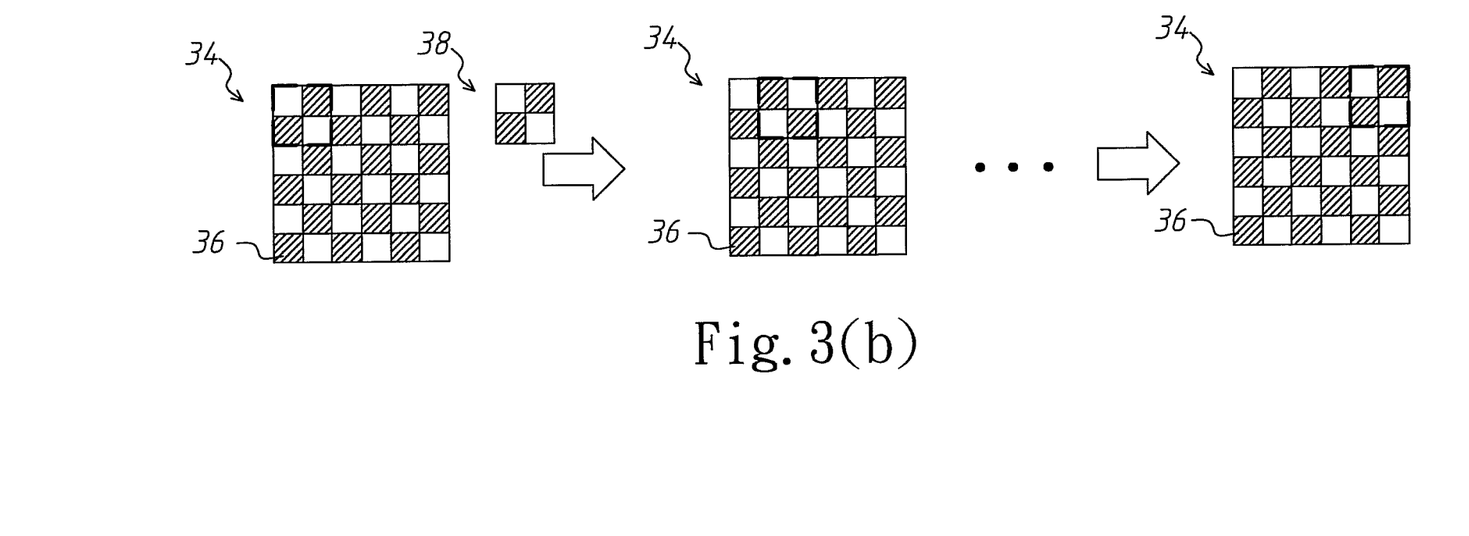
Figure 3C:
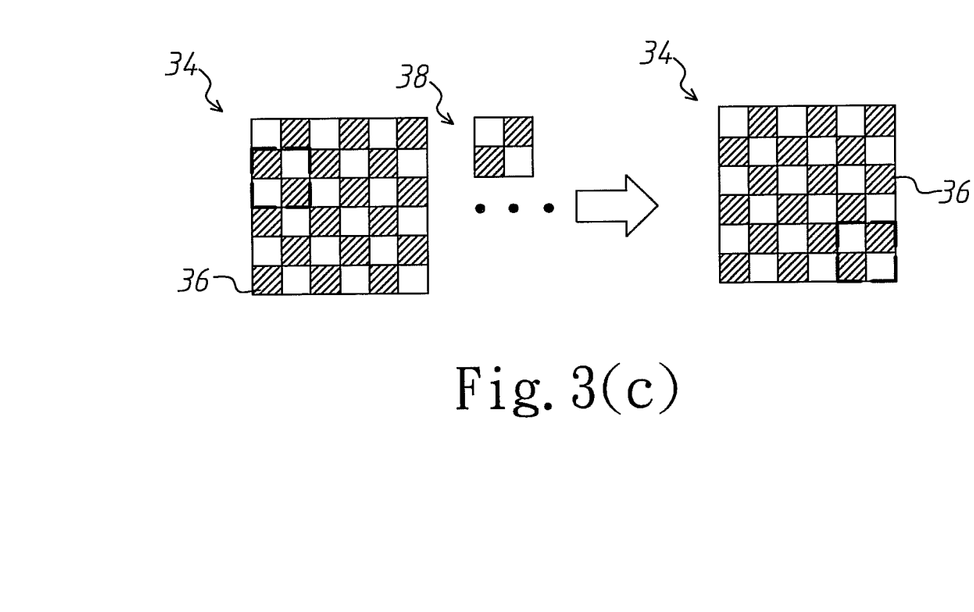

As shown in FIG. 3(b), the first reference gray-level frame 38 has a dimensionality of 2×2 pixels and contains two first black squares and two first white squares. The first black square is designated by hatchings, and the first white square is a blank block. The first black squares and first white squares are also arranged similarly to a checkerboard. If n=1, each block 36 contains one piece of pixel. In the drawings, the size of the dotted frame is identical to that of the first reference gray-level frame. Therefore, the regional image encased by the dotted frame is used as the first retrieved image. In retrieving regional images, the dotted frame moves from the first row and the first column of the blocks 36. The first retrieved image obtained at this time is compared with the first reference gray-level frame according to Equation (1) to obtain $a_{11}$. Then, the dotted frame moves rightward to sequentially obtain $a_{12}$, $a_{13}$, and $a_{14}$. When the dotted frame moves to the first row and the fifth column of the blocks 36, the first retrieved image obtained at this tune is compared with the first reference gray-level frame according to Equation (1) to obtain $a_{15}$. As shown in FIG. 3(c), when the dotted frame moves to the second row and the first column of the blocks 36, the first retrieved image obtained at this time is compared with the first reference gray-level frame according to Equation (1) to obtain $a_{21}$. Finally, the dotted frame moves to the fifth row and the fifth column of the blocks 36, and the first retrieved image obtained at this time is compared with the first reference gray-level frame according to Equation (1) to obtain $a_{55}$. $a_{11}$ . . . $a_{55}$ are all the first values and within the range between −1 and 1. The first values greater than 0 have a positive correlation; the first values smaller than 0 have negative correlation. The first values are arranged in a 2D matrix to establish a first 2D proto-matrix expressed by Equation (7):

$$\begin{bmatrix} a_{11} & a_{12} & a_{13} & a_{14} & a_{15} \\ a_{21} & a_{22} & a_{23} & a_{24} & a_{25} \\ a_{31} & a_{32} & a_{33} & a_{34} & a_{35} \\ a_{41} & a_{42} & a_{43} & a_{44} & a_{45} \\ a_{51} & a_{52} & a_{53} & a_{54} & a_{55} \end{bmatrix} \quad (7)$$

In Step S14, let the first values smaller than 0 be 0, and keep the rest of the first values unchanged, so as to transform the first 2D proto-matrix into a first 2D matrix. Suppose that $a_{15}$, $a_{23}$, $a_{32}$, $a_{41}$, and $a_{53}$ are negative values. Thus, the first 2D matrix is expressed by Equation (8):

$$\begin{bmatrix} a_{11} & a_{12} & a_{13} & a_{14} & 0 \\ a_{21} & a_{22} & 0 & a_{24} & a_{25} \\ a_{31} & 0 & a_{33} & a_{34} & a_{35} \\ 0 & a_{42} & a_{43} & a_{44} & a_{45} \\ a_{51} & a_{52} & 0 & a_{54} & a_{55} \end{bmatrix} \quad (8)$$

In Step S16, multiply the elements of a retrieving matrix, which has a dimensionality equal to or smaller than that of the first reference gray-level frame, and the elements of the first 2D matrix to obtain a first anchor matrix. According to the first anchor matrix, the maximum first value found in the central region of the first 2D matrix is used as a first anchor value. Each element of the retrieving matrix is an arbitrary natural number. In this embodiment, the retrieving matrix has a dimensionality of p×p, wherein p is the distance of the centers of two adjacent black blocks. In this embodiment, the retrieving matrix has a dimensionality of 2×2 when the dimensionality of the first reference gray-level frame is 2×2. When the first reference gray-level frame has a dimensionality of m×m and m≥6, the retrieving matrix has a dimensionality of r×r, wherein r is a natural number and m≥r≥(m/2)−1.

After the first anchor value has been found, the process proceeds to Step S18. In Step S18, use the first anchor value to find a first position corresponding to the first anchor value in the gray-level image. The first position functions as the position of a first fiducial point. The present invention uses the 2D technology described above to fast and precisely find out the fiducial point, whereby is reduced the system BER (Bit Error Rate). The method of the present invention is not limited to applying to high-price precision optical systems. Therefore, the present invention can realize high-quality holographic data storage with a low-cost optical system.

The abovementioned first fiducial point is the fiducial point of the white blocks. The abovementioned method is simulated to calculate the fiducial point of the black block below.

In Step S20, use a second reference gray-level frame to sequentially retrieve regional images each having the same size as the second gray-level reference frame to function as second retrieved images. In other words, the retrieving activity starts from the first row and the first column of the blocks and advances toward the last row and the last column sequentially pixel by pixel. At the same time, compare the second reference gray-level frame with each second retrieved image to obtain a plurality of second values, which are used to construct a second 2D proto-matrix. The second reference gray-level frame may be in form of a square, a strip, a cross, intersecting lines, a circle, a triangle, a rhombus, or a polygon. In the drawings, a square is used to exemplify the second reference gray-level frame. The second reference gray-level frame has a dimensionality of m×m, wherein m≥2 and m is a natural number. The dimensionality of the second reference gray-level frame is identical to that of the first reference gray-level frame. The value of m correlates with the magnifying power of the received image. The second reference gray-level frame includes a plurality of second black blocks and second white blocks. The abovementioned first white blocks and the second black blocks are at the same positions; the abovementioned first black blocks and the second white blocks are at the positions. The gray-level values of the second black blocks and the second white blocks may be either assigned according to requirement of the system or respectively preset to be 0 and 225. Similarly, the second black blocks and the second white blocks are arranged like a checkerboard. The second reference gray-level frame may be established in the system beforehand or obtained via exchanging the positions of the first black blocks and the first white blocks of the first reference gray-level frame. Further, an SSIM (Structure Similarity) algorithm is used to perform regional comparison for the second reference gray-level frame and each second retrieved image. The second value V2 is obtained according to Equation (9):

$$V2 = \frac{(2\mu_x \mu_{yII} + C_{1II})(2\sigma_{xyII} + C_{2II})}{(\mu_x^2 + \mu_{yII}^2 + C_{1II})(\sigma_x^2 + \sigma_{yII}^2 + C_{2II})} \quad (9)$$

wherein x is the gray-level image and yII is the second retrieved image, and wherein $C_{1II}$ and $C_{2II}$ correlate the brightnesses, contrast ratios and constitutive properties of the gray-level image and the second retrieved image, and wherein $0 < C_{1II} < 0.1$ and $0 < C_{2II} < 0.1$, and wherein $\mu_x$ and $\mu_{yII}$ are respectively the image strengths of the gray-level image and the second retrieved image and respectively expressed by Equation (10) and Equation (11), and wherein $\sigma_x$ and $\sigma_{yII}$ are respectively the image standard deviations of the gray-level image and the second retrieved image and respectively expressed by Equation (12) and Equation (13), and wherein $\sigma_{xyII}$ is the covariable of the gray-level image and the second retrieved image and expressed by Equation (14).

$$\mu_x = \frac{1}{N} \sum_{i=1}^{N} x_i \quad (10)$$

$$\mu_{yII} = \frac{1}{N} \sum_{i=1}^{N} yII_i \quad (11)$$

$$\sigma_x = \left[ \frac{1}{N-1} \sum_{i=1}^{N} (x_i - \mu_x)^2 \right]^{1/2} \quad (12)$$

$$\sigma_{yII} = \left[ \frac{1}{N-1} \sum_{i=1}^{N} (yII_i - \mu_{yII})^2 \right]^{1/2} \quad (13)$$

$$\sigma_{xyII} = \frac{1}{N-1} \sum_{i=1}^{N} (x_i - \mu_x)(yII_i - \mu_{yII}) \quad (14)$$

Figure 3D:
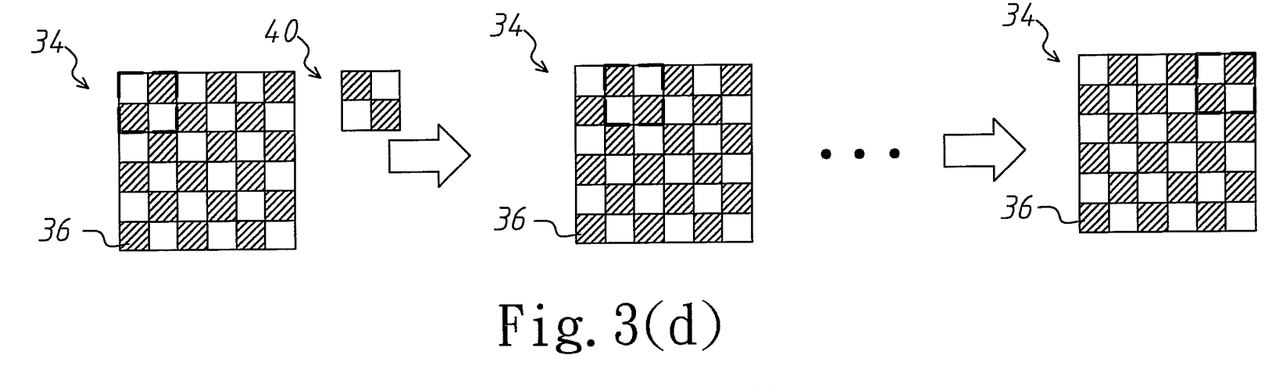
Figure 3E:
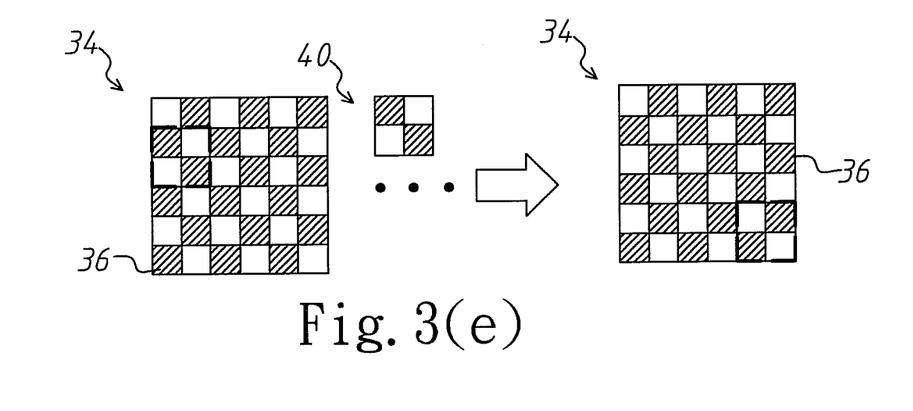

As shown in FIG. 3(d), the second reference gray-level frame 40 has a dimensionality of 2×2 pixels and contains two second black squares and two second white squares. The second black square is designated by hatchings, and the second white square is a blank block. The second black squares and second white squares are also arranged like a checkerboard. If n=1, each block 36 contains one piece of pixel. In the drawings, the size of the dotted frame is identical to that of the second reference gray-level frame. Therefore, the regional image encased by the dotted frame is used as the second retrieved image. In retrieving regional images, the dotted frame moves from the first row and the first column of the blocks 36. The second retrieved image obtained at this time is compared with the second reference gray-level frame according to Equation (9) to obtain $b_{11}$. Then, the dotted frame moves rightward to sequentially obtain $b_{12}$, $b_{13}$, and $b_{14}$. When the dotted frame moves to the fifth column and the first row of the blocks 36, the second retrieved image obtained at this time is compared with the second reference gray-level frame according to Equation (9) to obtain $b_{15}$. As shown in FIG. 3(e), when the dotted frame moves to the second row and the first column of the blocks 36, the second retrieved image obtained at this time is compared with the second reference gray-level frame according to Equation (9) to obtain $b_{21}$. Finally, the dotted frame moves to the fifth row and the fifth column of the blocks 36, and the second retrieved image obtained at this time is compared with the second reference gray-level frame according to Equation (9) to obtain $ba_{55}$.

$b_{11} \ldots b_{55}$ are all the second values and within the range between −1 and 1. The second values greater than 0 have positive correlation; the second values smaller than 0 have negative correlation. The second values are arranged in a 2D matrix to establish a second 2D proto-matrix expressed by Equation (15):

$$\begin{bmatrix} b_{11} & b_{12} & b_{13} & b_{14} & b_{15} \\ b_{21} & b_{22} & b_{23} & b_{24} & b_{25} \\ b_{31} & b_{32} & b_{33} & b_{34} & b_{35} \\ b_{41} & b_{42} & b_{43} & b_{44} & b_{45} \\ b_{51} & b_{52} & b_{53} & b_{54} & b_{55} \end{bmatrix} \quad (15)$$

In Step S22, let the second values smaller than 0 be 0, and keep the rest of the second values unchanged, so as to transform the second 2D proto-matrix into a second 2D matrix. Suppose that $b_{15}$, $b_{23}$, $b_{32}$, $b_{41}$, and $b_{53}$ are negative values. Thus, the second 2D matrix is expressed by Equation (16):

$$\begin{bmatrix} b_{11} & b_{12} & b_{13} & b_{14} & 0 \\ b_{21} & b_{22} & 0 & b_{24} & b_{25} \\ b_{31} & 0 & b_{33} & b_{34} & b_{35} \\ 0 & b_{42} & b_{43} & b_{44} & b_{45} \\ b_{51} & b_{52} & 0 & b_{54} & b_{55} \end{bmatrix} \quad (16)$$

In Step S24, multiply the elements of the abovementioned retrieving matrix and the elements of the second 2D matrix to obtain a second anchor matrix. According to the second anchor matrix, the maximum second value found in the central region of the second 2D matrix is used as a second anchor value.

In Step S26, use the second anchor value to find a second position corresponding to the second anchor value in the gray-level image. The second position functions as the position of a second fiducial point.

The abovementioned second fiducial point is the fiducial point of the black blocks. According to theoretic computation, the error of the first or second fiducial point obtained with the SSIM algorithm is below 50%. Therefore, the method of the present invention not only can prevent images from being distorted or out of focus but also can correctly recover the gray-level patterns received by the 2D detector.

In the present invention, Steps S20-S26 can be omitted from Steps S10-S26. In such a case, only the first fiducial point is used as the fiducial point of the image received by the 2D detector. However, the abbreviated process of the present invention can also prevent images from being distorted or out of focus.

In conclusion, the present invention uses a reference gray-level frame to perform regional comparison and uses a 2D approach to fast find out the fiducial point to satisfy the technical requirement of high-quality holographic data storage.

The embodiments described above are only to exemplify the present invention but not to limit the scope of the present invention. Any equivalent modification or variation according to the spirit of the present invention is to be also included within the scope of the present invention.

What is claimed is:

1. A method to determine a fiducial point for holographic data storage, comprising steps:
   receiving a gray-level image;
   using a first reference gray-level frame to sequentially retrieve from said gray-level image regional images each having a same size as said first reference gray-level frame to function as first retrieved images, comparing said first reference gray-level frame with each said first retrieved image to obtain a plurality of first values, and using said first values to construct a first 2D proto-matrix;
   transforming said first 2D proto-matrix into a first 2D matrix via letting said first values which are smaller than 0 be 0 and keeping unchanged said first values equal to or greater than 0;
   using said first 2D matrix and a retrieving matrix, which has a dimensionality equal to or smaller than that of said first reference gray-level frame, to obtain a first anchor matrix, and finding a greatest said first value in a central region of said first 2D matrix to function as a first anchor value according to said first anchor matrix; and
   using said first anchor value to find a first position corresponding to said first anchor value in said gray-level image, and using said first position as a position of a first fiducial point,
   wherein said gray-level image has a grayscale depth of N bits, and wherein said first value is denoted by V1 and obtained according to an equation:

$$V1 = \frac{(2\mu_x \mu_{yI} + C_{1I})(2\sigma_{xyI} + C_{2I})}{(\mu_x^2 + \mu_{yI}^2 + C_{1I})(\sigma_x^2 + \sigma_{yI}^2 + C_{2I})}$$

wherein x is said gray-level image and yI is said first retrieved image,
   wherein $0<C_{1I}<0.1$ and $0<C_{2I}<0.1$,
   wherein $\mu_x$ and $\mu_{yI}$ are respectively image strengths of said gray-level image and said first retrieved image,
   wherein $\sigma_x$ and $\sigma_{yI}$ are respectively image standard deviations of said gray-level image and said first retrieved image,
   wherein $\sigma_{xyI}$ is a covariable of said gray-level image and said first retrieved image,
   wherein $$\mu_x = \frac{1}{N}\sum_{i=1}^{N} x_i, \mu_{yI} = \frac{1}{N}\sum_{i=1}^{N} yI_i,$$

$$\sigma_x = \left[\frac{1}{N-1}\sum_{i=1}^{N}(x_i - \mu_x)^2\right]^{1/2}, \sigma_{yI} = \left[\frac{1}{N-1}\sum_{i=1}^{N}(yI_i - \mu_{yI})^2\right]^{1/2},$$

$$\sigma_{xyI} = \frac{1}{N-1}\sum_{i=1}^{N}(x_i - \mu_x)(yI_i - \mu_{yI}),$$

and
   wherein said gray-level image has a plurality of blocks, and wherein each said block contains n×n pieces of pixels, and wherein n is a natural number, and wherein retrieving said first retrieved images starts from a first row and a first column of said blocks and advances toward a last row and a last column sequentially pixel by pixel.

2. The method to determine the fiducial point for holographic data storage according to claim 1, wherein in said step of using said first 2D matrix and said retrieving matrix to obtain said first anchor matrix, elements of said retrieving matrix are multiplied by elements of said first 2D matrix to obtain said first anchor matrix, and wherein each element of said retrieving matrix is an arbitrary natural number.

3. The method to determine the fiducial point for holographic data storage according to claim 1, wherein said first reference gray-level frame is in form of a strip, a cross, intersecting lines, a circle, a triangle, a rhombus, a square, or a polygon.

4. The method to determine the fiducial point for holographic data storage according to claim 1, wherein said block is a black block or a white block, and wherein said gray-level image contains a plurality of said black blocks and said white blocks, and wherein said first reference gray-level frame has a dimensionality of m×m, and wherein m≥2 and m is a natural number, and wherein said first reference gray-level frame includes a plurality of first black squares and first white squares.

5. The method to determine the fiducial point for holographic data storage according to claim 4, wherein when said first reference gray-level frame has a dimensionality of 2×2, said retrieving matrix has a dimensionality of 2×2.

6. The method to determine the fiducial point for holographic data storage according to claim 4, wherein when said first reference gray-level frame has a dimensionality of m×m and m≥6, said retrieving matrix has a dimensionality of r×r, and wherein r is a natural number and m≥r≥(m/2)−1.

7. The method to determine the fiducial point for holographic data storage according to claim 4, wherein said black blocks and said white blocks are arranged like a checkerboard, and wherein said first black squares and said first white squares are also arranged like a checkerboard.

8. The method to determine the fiducial point for holographic data storage according to claim 4 further comprising steps:
  using a second reference gray-level frame to sequentially retrieve from said gray-level image regional images each having a same size as said second reference gray-level frame to function as second retrieved images, comparing said second reference gray-level frame with each said second retrieved image to obtain a plurality of second values, using said second values to construct a second 2D proto-matrix, wherein said second reference gray-level frame has a dimensionality identical to that of said first reference gray-level frame, and wherein said second reference gray-level frame includes a plurality of second black squares and second white squares, and wherein said first white squares and said second black squares are at identical positions, and wherein said first black squares and said second white squares are at identical positions;
  transforming said second 2D proto-matrix into a second 2D matrix via letting said second values smaller than 0 be 0 and keeping unchanged said second values equal to or greater than 0;
  using said retrieving matrix and said second 2D matrix to obtain a second anchor matrix, and finding a greatest said second value in a central region of said second 2D matrix to function as a second anchor value according to said second anchor matrix; and
  using said second anchor value to find a second position corresponding to said second anchor value in said gray-level image, and using said second position as a position of a second fiducial point.

9. The method to determine the fiducial point for holographic data storage according to claim 8, wherein said gray-level image has a grayscale depth of N bits, and wherein said second value is denoted by V2 and obtained according to an equation:

$$V2 = \frac{(2\mu_x\mu_{yII} + C_{1II})(2\sigma_{xyII} + C_{2II})}{(\mu_x^2 + \mu_{yII}^2 + C_{1II})(\sigma_x^2 + \sigma_{yII}^2 + C_{2II})}$$

wherein x is said gray-level image and yII is said second retrieved image, and
wherein $0<C_{1II}<0.1$ and $0<C_{2II}<0.1$, and
wherein $\mu_x$ and $\mu_{yII}$ are respectively image strengths of said gray-level image and said second retrieved image, and
wherein $\sigma_x$ and $\sigma_{yII}$ are respectively image standard deviations of said gray-level image and said second retrieved image, and
wherein $\sigma_{xyII}$ is a covariable of said gray-level image and said second retrieved image, and
wherein $$\mu_x = \frac{1}{N}\sum_{i=1}^{N} x_i, \quad \mu_{yII} = \frac{1}{N}\sum_{i=1}^{N} yII_i,$$

$$\sigma_x = \left[\frac{1}{N-1}\sum_{i=1}^{N}(x_i - \mu_x)^2\right]^{1/2}, \quad \sigma_{yII} = \left[\frac{1}{N-1}\sum_{i=1}^{N}(yII_i - \mu_{yII})^2\right]^{1/2},$$

$$\sigma_{xyII} = \frac{1}{N-1}\sum_{i=1}^{N}(x_i - \mu_x)(yII_i - \mu_{yII}).$$

10. The method to determine the fiducial point for holographic data storage according to claim 8, wherein in said step of using said retrieving matrix and said second 2D matrix to obtain said second anchor matrix, elements of said retrieving matrix are multiplied by elements of said second 2D matrix to obtain said second anchor matrix, and wherein each element of said retrieving matrix is an arbitrary natural number.

11. The method to determine the fiducial point for holographic data storage according to claim 8, wherein said gray-level image has a plurality of blocks, and wherein each said block contains n×n pieces of pixels, and wherein n is a natural number, and wherein retrieving said second retrieved images starts from a first row and a first column of said blocks and advances toward a last row and a last column sequentially pixel by pixel.

12. The method to determine the fiducial point for holographic data storage according to claim 8, wherein said second reference gray-level frame is in form of a strip, a cross, intersecting lines, a circle, a triangle, a rhombus, a square, or a polygon.

* * * * *